(12) United States Patent
Nazarian et al.

(10) Patent No.: US 10,024,149 B2
(45) Date of Patent: Jul. 17, 2018

(54) METHOD FOR $CO_2$ EOR AND STORAGE AND USE THEREOF

(71) Applicant: STATOIL PETROLEUM AS, Stavanger (NO)

(72) Inventors: Bamshad Nazarian, Ranheim (NO); Philip Sefton Ringrose, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 9 days.

(21) Appl. No.: 14/784,368

(22) PCT Filed: Apr. 17, 2014

(86) PCT No.: PCT/EP2014/057978
§ 371 (c)(1),
(2) Date: Oct. 14, 2015

(87) PCT Pub. No.: WO2014/170466
PCT Pub. Date: Oct. 23, 2014

(65) Prior Publication Data
US 2016/0053594 A1 Feb. 25, 2016

(30) Foreign Application Priority Data

Apr. 17, 2013 (WO) .................. PCT/EP2013/058033

(51) Int. Cl.
*E21B 43/16* (2006.01)
*B65G 5/00* (2006.01)
(Continued)

(52) U.S. Cl.
CPC .............. *E21B 43/164* (2013.01); *B65G 5/00* (2013.01); *C09K 8/58* (2013.01); *C09K 8/594* (2013.01);
(Continued)

(58) Field of Classification Search
CPC ...... E21B 43/164; E21B 43/16; E21B 43/168; E21B 43/166
See application file for complete search history.

(56) References Cited

U.S. PATENT DOCUMENTS 3,794,114 A * 2/1974 Brandon ............... E21B 43/003
166/249
4,068,716 A 1/1978 Allen
(Continued)

FOREIGN PATENT DOCUMENTS

| CN | 101446189 | 6/2009 |
| WO | 2009/094285 | 7/2009 |
| WO | 2012/41926 | 4/2012 |

OTHER PUBLICATIONS

Nazarian et al., "Reservoir Management of $CO_2$ Injection: Pressure Control and Capacity Enhancement", *Energy Procedia*, 2013, No. 37, pp. 4533-4543.
(Continued)

*Primary Examiner* — Zakiya W Bates
(74) *Attorney, Agent, or Firm* — Wenderoth, Lind & Ponack, L.L.P.

(57) ABSTRACT

A method of Enhanced Oil Recovery from oil zones in a subterranean geological formation, and from oil zones. The method including: a first injecting step of injecting a first composition including $CO_2$ into the subterranean geological formation for a period of time; a second injecting step of injecting a second composition including $CO_2$ and a hydrocarbon into the subterranean geological formation for a period of time, wherein the first composition and the second composition are different; and extracting oil from the subterranean geological formation.

11 Claims, 1 Drawing Sheet

(51) Int. Cl.
*C09K 8/58* (2006.01)
*C09K 8/594* (2006.01)
*E21B 41/00* (2006.01)
*E21B 43/24* (2006.01)

(52) U.S. Cl.
CPC ........ *E21B 41/0064* (2013.01); *E21B 43/166* (2013.01); *E21B 43/24* (2013.01); *Y02C 10/14* (2013.01); *Y02P 90/70* (2015.11)

(56) References Cited

U.S. PATENT DOCUMENTS

| | | | | |
|---|---|---|---|---|
| 4,605,066 | A | * | 8/1986 | Djabbarah ............ E21B 43/164 166/403 |
| 4,852,651 | A | | 8/1989 | Davis |
| 6,347,675 | B1 | | 2/2002 | Kolle |
| 2007/0187151 | A1 | | 8/2007 | Decker |
| 2008/0066918 | A1 | | 3/2008 | Smith |
| 2009/0056941 | A1 | | 3/2009 | Valdez |
| 2009/0250224 | A1 | | 10/2009 | Wright et al. |
| 2011/0198095 | A1 | | 8/2011 | Vianello |
| 2014/0251618 | A1 | * | 9/2014 | Al-Otaibi .............. E21B 43/164 166/305.1 |

OTHER PUBLICATIONS

Xu et al., "Thickening Carbon Dioxide with the Fluoroacrylate-Styrene Copolymer", *Society of Petroleum Engineers*, SPE Annual Technical Conference and Exhibition, New Orleans, LA, Sep. 30-Oct. 3, 2001.

McPherson et al., "Two equations of state assembled for basic analysis of multiphase $CO_2$ flow and in deep sedimentary basin conditions", *Computers and Geosciences*, 2008, No. 34, pp. 427-444.

Battistelli et al., "TMGAS: A new TOUGH2 EOS module for the numerical simulation of gas mixtures injection in geological structures", *International Journal of Greenhouse Gas Control*, 2009, No. 3, pp. 481-493.

Sasaki et al., "Numerical simulation of supercritical $CO_2$ injection into subsurface rock masses", *Energy Conversion and Management*, 2008, No. 49, pp. 54-61.

Ringrose et al., "The In Salah $CO_2$ storage project: lessons learned and knowledge transfer", *Energy Procedia*, 2013, No. 37, pp. 6226-6236.

Enick et al., "Mobility and Conformance Control for Carbon Dioxide Enhanced Oil Recovery ($CO_2$-EOR) via Thickeners, Foams, and Gels—A Detailed Literature Review of 40 Years of Research", *National Energy Technology Laboratory*, 2011, DOE/NETL-2012/1540, Activity 4003.200.01.

International Search Report dated May 14, 2014 in corresponding International Application No. PCT/EP2014/057978.

Tiffin et al., "Displacement Mechanism and Water Shielding Phenomena for a Rich-Gas/Crude-Oil System", *SPE Reservoir Engineering*, 1991, p. 193-199.

* cited by examiner

METHOD FOR CO₂ EOR AND STORAGE AND USE THEREOF

BACKGROUND OF THE INVENTION

1. Technical Field

The present invention relates to a method of Enhanced Oil Recovery (EOR). The present invention may also result in improved and/or optimized $CO_2$ storage.

2. Description of the Related Art

Injection of $CO_2$ is a well-known method to enhance recovery of oil from a formation. $CO_2$ Enhanced Oil Recovery (EOR) is a secondary or tertiary recovery method for oil production. $CO_2$ injection can be done after water injection or earlier in field development. Since the 1970s, $CO_2$ flooding has been one of the most successful gas injection techniques in the United States, but it is also used worldwide. $CO_2$ EOR has been applied in oil recovery from a variety of oil reservoirs in both sandstone and carbonate rocks.

The recovery mechanisms identified in $CO_2$ flooding are grouped into miscible and immiscible displacement. In immiscible displacement oil swelling and oil viscosity reduction have been identified as the main processes which enhance oil recovery. Vaporization of intermediate and heavy hydrocarbons and developed multi-contact miscibility are the main miscible displacement processes in $CO_2$ flooding to enhance oil recovery.

Further, $CO_2$ EOR has been considered for extracting oil from residual oil zones in which oil remains as immobile residual saturation below the water-oil-contact.

However it has been found that $CO_2$ enhanced oil recovery (EOR) can have the following problems: i) gravity segregation of $CO_2$ phase in a formation/reservoir resulting in bypassed oil zones—this is where the $CO_2$ segregates in the reservoir, for example to the upper part of the formation/reservoir, so that some of the oil zones are not affected by the injected $CO_2$; and ii) water shielding—this is where in-place oil is shielded by mobile water preventing $CO_2$ from contacting the oil. It is thought that $CO_2$ Enhanced Oil Recovery in residual oil zones in a formation will be restrained by the problems mentioned above, especially water shielding, since reservoir rock in residual oil zones is expected to be water-wet.

The estimated recoverable volume of paleo or residual oil zones from a number of onshore reservoirs is considerable: for example, in the United States this amounts to around 10GSm³ (giga standard cubic meter). Paleo and residual oil zones are also found in offshore oilfields, such as in the Norwegian Continental Shelf as reported by the Norwegian Petroleum Directorate.

Further, $CO_2$ EOR in residual oil zones can also be an effective method of storing considerable amounts of $CO_2$ underground, making this process a climate change mitigating measure.

The Sleipner carbon capture and storage (CCS) Project operated by Statoil, which is located 250 km off the Norwegian coast, is an example of the commercial storage of $CO_2$. The $CO_2$ is stored in supercritical state in the Utsira formation at a depth of 800-1000 m below the sea surface. The $CO_2$ produced during natural gas processing is captured and subsequently injected underground. $CO_2$ injection started in October 1996 and by 2012, more than 13 million tons of $CO_2$ had been injected at a rate of approximately 2700 tons per day. A shallow long-reach well is used to take the $CO_2$ 2.4 km away from the producing wells and platform area. The injection site is located beneath a local dome of the top Utsira formation.

Another known project is the In Salah CCS Project which is an onshore project for the production of natural gas located in the Algerian Central Sahara. The Krechba Field produces natural gas containing up to 10% of $CO_2$ from a number of geological reservoirs. $CO_2$ has been stripped from the gas and re-injected into a sandstone reservoir at a depth of 1800 m enabling the storage of up to 1 Mt of $CO_2$ per year.

While the global capacity to store $CO_2$ deep underground is believed to be large, the development of a new storage site is inevitably costly as it requires an assessment of potential risk to humans and the eco system. It is thus desirable that existing sites are exploited to maximum capacity. Current estimates suggest that the existing methods used to inject supercritical $CO_2$ into deep storage sites result in only around 2% of the pore volume of the geological storage site being utilized for $CO_2$ sequestration. This is believed to be due to the uneven sweep of the injected $CO_2$ in subterranean formations, which leads to a phenomenon called "fingering". "Fingering" is an effect in which the $CO_2$ injection front is highly uneven with small areas of high penetration surrounded by areas in which the $CO_2$ has not penetrated at all. Pursuing current practices will result in the loss of considerable storage volume in available storage sites.

In order to solve the above mentioned problems with $CO_2$ storage, a technique is described in WO 2012/041926 which is known as Composition Swing Injection (CSI). In the technique described in this document, a $CO_2$ composition injected into a subterranean geological formation is changed by addition of hydrocarbons, specifically light alkanes, in cycles between a gas-like and a liquid-like state. This cycling between injecting different compositions has the effect that the $CO_2$ plume is stabilized during the injection period so that the $CO_2$ storage capacity can be increased.

SUMMARY OF THE INVENTION

The present invention provides a method of Enhanced Oil Recovery (EOR) from oil zones in a subterranean geological formation, the method comprising: a first injecting step of injecting a first composition comprising $CO_2$ into the subterranean geological formation for a period of time; a second injecting step of injecting a second composition comprising $CO_2$ and a hydrocarbon into the subterranean geological formation for a period of time, wherein the first composition and the second composition are different; and extracting oil from the subterranean geological formation.

The purposeful enrichment of the $CO_2$ composition with hydrocarbons, preferably intermediate hydrocarbons, alters the viscosity and density of the $CO_2$ composition at the site of injection. The hydrocarbons can be selected to make the $CO_2$ composition miscible with the residual oil. This may, therefore, enhance the extraction of the residual oil.

It has been found that injecting a first composition for a period of time followed by a second composition for a period of time can be used to improve the process of Enhanced Oil Recovery. This is because the different injected compositions have different properties, such as density and viscosity. By controlling properties such as density and viscosity of the second composition in this manner, the area of the subterranean geological formation which is swept by the injected compositions which contain $CO_2$ can be increased. As a result, the amount of oil which is recovered from the subterranean geological formation may be increased.

It has also been found that this method may optimize $CO_2$ storage. This is because a larger area is swept by the injected composition so more $CO_2$ storage sites are encompassed and/or because the $CO_2$ plume is stabilized during the injection period.

A "subterranean geological formation" is an underground formation, which may be referred to as a reservoir, where oil can be found. The formation may be onshore or offshore.

The oil zones of the subterranean geological formation may be paleo or residual oil zones.

The hydrocarbon which is in the second composition may be selected to make the second composition miscible with residual oil in the subterranean geological formation. This may be achieved because the selected hydrocarbon(s) modify the properties of the injected $CO_2$ containing composition such that it becomes miscible with the oil to be extracted.

The selection of hydrocarbon(s) to cause the second composition to be miscible with the residual oil depends on a number of factors, such as the precise composition of the oil, the conditions, such as temperature and pressure, in the subterranean geological formation and the temperature and pressure of the injected compositions.

Selecting appropriate hydrocarbon(s) to make the second composition miscible with residual oil will further enhance oil extraction as the oil combined with second composition will be easier to extract. This is because the viscosity of the oil may be reduced so that it can flow to a production well.

The hydrocarbon in the second composition may comprise a light, intermediate, and/or heavy hydrocarbon(s). Light hydrocarbons are hydrocarbons with a number of carbon atoms in the range C1 to C4 (typical molecular weight (MW) of less than 72 g/mol), intermediate hydrocarbons are hydrocarbons with a number of carbon atoms in the range C5 to C10 (typical molecular weight (MW) of 72-142 g/mol) and heavy hydrocarbons are hydrocarbons with more than 10 carbon atoms (i.e. greater than C10 and a typical MW greater than 142 g/mol). As an example, the light hydrocarbons may comprise propane, iso-butane and/or butane, and the intermediate hydrocarbons may comprise pentane, hexane, and/or heptane.

The hydrocarbon(s) in the second composition may consist of light hydrocarbon(s), intermediate hydrocarbon(s) and/or heavy hydrocarbon(s).

The hydrocarbon(s) may be saturated hydrocarbon(s), e.g. alkanes. The hydrocarbon(s) may be either straight chain or branched chain hydrocarbon(s).

Further, the second composition may comprise more than one type of hydrocarbon. For example, the compositions may comprise a plurality of different hydrocarbons. Thus, the second composition may consist of $CO_2$ and one or more hydrocarbon(s) (which are preferably intermediate hydrocarbons). Additionally and/or alternatively, the second composition may comprise light hydrocarbons, i.e. hydrocarbons with C1 to C4 (MW typically less than 72 g/mol), preferably hydrocarbon(s) with a number of carbon atoms in the range C2 to C4 and a molecular weight of 30 to 85 g/mol, which may be in addition to intermediate and/or heavy hydrocarbon(s).

As discussed above, the technique of composition swing injection is previously known in the context of $CO_2$ storage, though, only light alkanes are used in the injected composition. This is because the injected composition is retained underground. As a result, heavier hydrocarbons (i.e. C5 or greater), which are more valuable, are not used because the hydrocarbons would also be trapped underground which means that $CO_2$ storage using heavier hydrocarbons is not viable.

However, in the present case, it has surprisingly been realized that varying the composition of the injected fluid can be used to enhance oil recovery. In this context it is possible to extract more oil and/or re-extract the injected composition and thus it is viable to use more valuable components such as intermediate and heavy hydrocarbons in the injected fluids.

The inventors have recognized that because it is viable to use heavier and more valuable hydrocarbons in the injected composition for the purpose of EOR, it is possible to select the hydrocarbons and their proportion (e.g. ratio of hydrocarbons to $CO_2$) in the second composition without such severe restraints due to the value of these hydrocarbons. As a result, appropriate hydrocarbons (which may be light, intermediate and/or heavy hydrocarbons) and/or proportion of hydrocarbon(s) can be selected to make the second $CO_2$ containing composition miscible with the oil.

This aids the extraction of the oil and also means that it is possible to recover the hydrocarbons in the second composition, which are mixed with the oil, from the extracted oil.

Thus, the method may comprise extracting oil and at least some, although preferably most, i.e. greater than 50%, 70%, 80% or 90%, of the injected second composition.

The precise amounts of $CO_2$ and/or hydrocarbon which are desirable/optimal will depend on a number of factors such as the hydrocarbons used, the oil composition and the subterranean geological formation conditions. However, preferably, the hydrocarbon content in the second composition is in the range of 1 mol % hydrocarbon to 50 mol % hydrocarbon, preferably 3 mol % hydrocarbon to 40 mol % hydrocarbon, preferably 5 to 15 mol % and most preferably 10 mol % hydrocarbon (where the mol % is relative to the composition as a whole). Preferably, the second composition comprises at least 80 mol % $CO_2$, more preferably at least 90 mol % $CO_2$.

The first composition may be essentially pure $CO_2$. For example, it may consist of $CO_2$ with unavoidable impurities, i.e. it may be substantially 100 mol % $CO_2$ (or greater than 99.9 mol % $CO_2$). Alternatively, the first composition may comprise other components in addition to the $CO_2$ For example, it may comprise light, intermediate and/or heavy hydrocarbons. However, as noted above, it is required that the composition of the first composition is different from the composition of the second composition. This is so that the injected compositions have different properties at a given temperature and pressure. For example, the first composition may comprise greater than 95 mol % $CO_2$ or greater than 98 mol % $CO_2$.

As an example, the first composition may be pure $CO_2$ with unavoidable impurities and the second composition may have the composition shown in the below table.

| Component | Mole fraction |
|---|---|
| CO2 | 0.92 |
| Methane | 0.0001 |
| Ethane | 0 |
| Propane | 0.002 |
| i-Butane | 0 |
| n-Butane | 0 |
| i-Pentane | 1.0E−05 |
| n-Pentane | 1.0E−05 |

-continued

| Component | Mole fraction |
|---|---|
| n-Hexane | 0.02 |
| n-Heptane | 0.06 |

The first composition and the second composition may come from two separate sources which provide different $CO_2$ containing compositions. For example, they may come from different $CO_2$ capture processes, gas processing facilities or subterranean sources which provide different $CO_2$ compositions.

Alternatively, there may be a single source of $CO_2$-containing composition (which may be pure $CO_2$ with unavoidable impurities) with which additional components, such as intermediate and/or heavy hydrocarbons, are mixed to provide the second composition. The source of $CO_2$ containing composition may provide the first composition or the source of $CO_2$ containing composition may be mixed with additional additives, mainly hydrocarbons, to provide the first composition or the source may be purified to provide the first composition.

Preferably the method comprises cycling alternately between the first injecting step and the second injecting step, i.e. the first injecting step is performed for a period of time followed by the second injecting step for a period of time, again followed by the first injecting step for a period of time, and so forth.

In a given cycle, the duration of the time period of the injection of the first composition may be the same as the time period of the injection of the second composition. Alternatively, the time periods may be different, e.g. the time period of the injection of the second composition may be longer than the time period of the injection of the first composition or vice versa. Also, the time period of injection of the first and second compositions may vary between cycles.

Preferably the time periods are each longer than a month, i.e. the time a composition is injected before it is changed is preferably longer than a month. The time periods may each be between one month and one year, or between three and six months. For example, the injection of the first composition may be performed for three months followed by injection of the second composition for six months, again followed by the injection of the first composition for three months.

The method may further comprise a third injecting step of injecting a third composition comprising $CO_2$ into the subterranean geological formation for a third period of time, wherein the third composition is different from the first and the second compositions. This third injecting step may be performed alternately with the first and second injecting steps in a repeating cycle. There may also be one or more still further injecting steps which are also performed alternately with the first and second injecting steps in a repeating cycle.

Preferably the first composition and/or the second composition are injected at or near their supercritical state. The compositions may be compressed to assume a supercritical, or near supercritical state at the site of injection.

Close to the critical point, small changes in composition can result in large changes in properties. Thus, although the composition of the first and second compositions may be relatively similar, the properties of the two fluids may be very different when they are at or near their supercritical state. This can aid oil extraction as the two distinct phases can have very different properties and thus sweep a larger area of the subterranean formation (e.g. due to decreased segregation).

A supercritical fluid exists in a phase between liquid and gas. It cannot actually become a liquid or a gas, yet it can demonstrate more gas-like or more liquid-like properties i.e. occupy a different supercritical "phase" by virtue of its viscosity and density. The different phases may be called gas-like or liquid-like phases. Preferably the first injection step comprises injecting a gas-like phase and the second injection step comprises injecting a liquid-like phase.

The composition can be altered to have a higher or lower critical temperature and pressure by the addition of a defined concentration of one or more hydrocarbons. This shift in the critical properties means that at the same injection temperature and pressure, the hydrocarbon enriched composition will have a different viscosity/density to that of the nonhydrocarbon-enriched composition.

In addition to the composition of the injected composition being changed between the first and the second injection step, the temperature and/or pressure of the injected compositions may also be different. This means that the properties, e.g. density and viscosity, may further be tailored between the two injection steps.

Alternatively, the pressure and temperature of the injected compositions may be relatively constant.

In another aspect, the present invention provides a method for Enhanced Oil Recovery and optimized $CO_2$ storage in residual oil zones, in which a $CO_2$ containing composition is mixed with a hydrocarbon containing fluid into a combined composition, the combined composition is injected into an injection well and further into a formation.

In yet another aspect, the present invention comprises a method for Enhanced Oil Recovery and optimized $CO_2$ storage, in which a $CO_2$ containing composition is mixed with a hydrocarbon containing fluid into a combined composition, the combined composition being cycled between at least two sets of injection parameters prior to injection of the composition into an injection well and further into the formation at or near supercritical conditions. In the present invention the hydrocarbon containing fluid may be chosen among intermediate and heavy hydrocarbons.

In another aspect, the present invention provides a modified $CO_2$ EOR method for oil production from paleo and residual oil zones combined with optimized $CO_2$ storage in which a $CO_2$ composition to be injected into a subterranean geological formation is changed in cycles to create gas-like and liquid like states, wherein, to achieve the liquid-like state, intermediate and heavy hydrocarbons are added to the $CO_2$ containing composition to modify density and viscosity of the injected stream.

Each of the aspects discussed above preferably comprise one or more of the other features of the invention discussed above.

The method may comprise recirculating at least $CO_2$ and/or hydrocarbons from the formation, in addition to extracting oil. In other words, the step of extracting may also comprise extracting one or more of at least some of the injected $CO_2$ and hydrocarbons. In this case, the injected $CO_2$ and hydrocarbons may be separated from the extracted oil and used to form on the compositions which are injected.

The extracted and/or recirculated components from the formation may be conveyed to a separation unit.

Preferably at least one of the extracted $CO_2$ and hydrocarbons are separated by the separation unit and conveyed from the separation unit to the injection well.

In the present invention residual oil may be separated by a separation unit.

In preferred embodiments of the present invention, the combined composition (i.e. first or second composition) comprises gas-like or liquid-like behaviour at supercritical conditions or near supercritical conditions by cycling between at least two sets of injection parameters. The injection parameters may be the composition, temperature and/or pressure of the injected composition.

The present invention comprises use of the method described for enhancing oil recovery.

Further in one embodiment of the invention comprises use of a method as mentioned above for improving and/or optimizing $CO_2$ storage.

The present invention also provides an apparatus for carrying out the above described methods of Enhanced Oil Recovery.

The present invention may also provide an apparatus or installation for Enhanced Oil Recovery from oil zones in a subterranean geological formation, the apparatus or installation comprising an injection well leading into the subterranean geological formation for injecting compositions into the formation, a supply of $CO_2$, a supply of a hydrocarbon, a means for controlling the composition injected via the injection well such that the composition can be cyclically alternated between a first composition comprising $CO_2$ and a second composition comprising $CO_2$ and the hydrocarbon, and a production well for extracting oil from the subterranean geological formation.

The supply of $CO_2$ may supply substantially pure $CO_2$ or it may supply $CO_2$ with other additions such as hydrocarbon(s). The supply of a hydrocarbon may supply one or more hydrocarbons which may be supplied with $CO_2$. The supply of $CO_2$ may provide the first composition and/or the supply of a hydrocarbon (which may be mixed with other additions such as $CO_2$) may provide the second composition. Alternatively or additionally, the supply of $CO_2$ may be mixed with the supply of a hydrocarbon to provide the second composition.

The supply of $CO_2$ and/or the supply of a hydrocarbon may be in the form of man-made supplies such as tanks. The supply of $CO_2$ and/or the supply of a hydrocarbon may be from a natural source such as an underground reservoir.

The apparatus may further comprise a separation unit. The separation unit may be arranged to receive the fluid extracted from the production well. In use, oil and possibly one or more of the components of the first and/or second composition may be extracted via the production well. The separation unit may be arranged to separate components of the first and/or second compositions from the extracted oil. The separated components (e.g. $CO_2$ and hydrocarbons) may be fed back to the injection well where they may be used to form the first and/or second compositions.

It will be appreciated that in preferred embodiments of the present invention, Composition Swing Injection (CSI) technique is applied as a modified $CO_2$ EOR method for oil production from paleo and residual oil zones combined with optimized $CO_2$ storage. The methods used to achieve the liquid-like behaviour is to add intermediate and/or heavy hydrocarbons to the $CO_2$ containing composition to modify density and viscosity of the injected stream.

Using composition swing injection in which one of the injection cycles comprises injecting a composition containing $CO_2$ and a hydrocarbon for Enhanced Oil Recovery may have the following advantages compared to known $CO_2$ EOR:

miscibility with the residual oil at in situ conditions resulting in considerable reduction in residual oil saturation and increased volume of recoverable oil;

stable and compact $CO_2$ plume that increases the sweep efficiency and consequently results in higher recovery factors from the residual oil zone;

considerable amount of $CO_2$ can be permanently stored in paleo and residual oil reservoirs due to $CO_2$ occupying the pore space previously occupied by oil in a process where $CO_2$ gravity override is significantly reduced and high sweep efficiency is achieved.

The injection cycle of composition with gas-like and then liquid-like behaviour can vary (depending on the reservoir and the oil to be extracted) but an example injection cycle may comprise two months of liquid-like injection, where intermediate and/or heavy hydrocarbon containing composition is added, followed by one month of gas-like injection wherein an intermediate and/or heavy hydrocarbon containing composition is not added. The cost of added hydrocarbon containing composition is offset against the added effectiveness of oil recovery and $CO_2$ storage using this technique and/or the possibility of extracting at least some of the added hydrocarbons from the extracted oil.

In preferred embodiments of the present invention, the method comprises recycling $CO_2$ produced with the oil extracted from a production well. In one embodiment of the present invention when CSI is applied to EOR in residual oil zones, the produced $CO_2$ may be recycled, but in addition some components of the produced oil may also be recycled. In one embodiment of the present invention $CO_2$ can also be captured from the oil or gas used in energy combustion, and optionally re-injected, leading to the possibility of near-zero $CO_2$ emissions for the total system.

In preferred embodiments of the present invention, less segregation tendency is achieved by applying Composition Swing Injection (CSI) technique resulting in a more viscous $CO_2$ composition. Injection of $CO_2$ water-alternating-gas (WAG) is not necessarily required since gravity override is considerably reduced in Composition Swing Injection. Consequently, the problems associated with water shielding may be resolved.

In preferred embodiments of the present invention, combined $CO_2$ storage and enhanced oil recovery can be achieved. The extra income from enhanced oil production can cover part of the costs associated with $CO_2$ Capture and Storage making this process a very attractive $CO_2$ Capture Utilization and Storage (CCUS) method. Composition Swing Injection may be implemented using available $CO_2$ rich gas streams and hydrocarbon liquid and gas streams in order to achieve enhanced $CO_2$ storage and $CO_2$ EOR.

An embodiment of the invention will now be described by way of example only with reference to the attached FIGURE. It should be understood that the drawing is not necessarily drawn to scale and that it is merely intended to schematically illustrate the structures and procedures described herein.

DETAILED DESCRIPTION OF THE INVENTION

Figure 1:
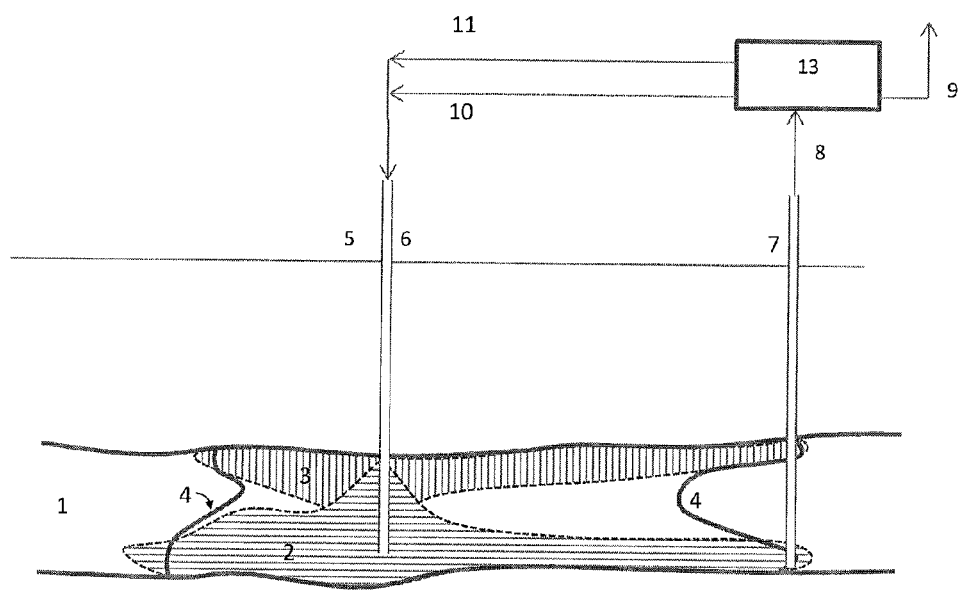
FIG. 1 shows an apparatus for the injection of a $CO_2$ containing composition into a geological formation and a schematic representation of an injection front formed according to the present invention.

The apparatus comprises an injection well 5 which comprises a conduit 6 for injecting $CO_2$ comprising compositions into a geological formation 1. It further comprises a production well 7 for the extraction and/or recirculation of at least one of residual oil, $CO_2$ and hydrocarbon from the formation 1.

The fluid extracted via the production well 7 is directed to a separation unit 13. At the separation unit 13 the extracted fluid is separated into oil and/or gas, which is directed via pipe 9 to be used or further transported, and $CO_2$ and hydrocarbons, which are directed via pipes 10 and 11 to be re-injected into the geological formation 1 via the injection well 5. The apparatus may be used for a method of Enhanced Oil Recovery from oil zones in the subterranean geological formation 1. The method comprises cyclically alternating between injecting a first composition of substantially pure $CO_2$ at or near its supercritical point into the subterranean geological formation 1 for a period of time via the injection well 5 and injecting a second composition comprising $CO_2$ and a hydrocarbon (preferably an intermediate and/or heavy hydrocarbon) at or near its supercritical point into the subterranean geological formation 1 for a subsequent period of time via the injection well 5. The method also comprises extracting oil from the subterranean geological formation 1 via the production well 7.

In other words, the characteristics of injection parameters are cycled between at least two sets of injection parameters prior to injection of the composition, resulting in, among other properties, the density and viscosity of the composition being varied during injection. Specifically, injecting a first composition comprising $CO_2$ for a period of time is alternatingly cycled with injecting a second composition comprising $CO_2$ and a hydrocarbon (preferably an intermediate and/or heavy hydrocarbon). The first composition comprising $CO_2$ or the second composition comprising $CO_2$ mixed with a hydrocarbon containing fluid is injected via the injection well 5 and a conduit 6 into a geological formation 1. The geological formation 1 can also be understood to be a storage reservoir.

When the injection parameters are changed (e.g. the composition is changed by the addition of hydrocarbons) to give a higher viscosity and higher density the composition behaves more like a liquid. During injection of the liquid-like composition, the injected stream tends to occupy the lower areas 2 of the geological storage formation 1. The gas-like composition tends to occupy the upper areas 3 of the geological storage formation 1. The stabilized Compositional Swing Injection (CSI) front 4 is more uniform, and the storage capacity of the geological formation 1 may therefore be increased. Further, the present invention may enhance oil recovery and increase sweep efficiency due to the different viscosities and densities of the injected compositions. Further, at least one of the components ($CO_2$ and hydrocarbons) are recirculated from the formation via a production well 7.

The injection of the first or the second composition may also be used to assess the geology of the subterranean formation. This is because the time to breakthrough, i.e. the time for the injected composition to reach a production well, for each phase (i.e. composition) can be observed in the production well. Further a wellhead or down-hole monitoring of $CO_2$ and hydrocarbons can be used in order to among others monitor and characterize the CSI front/profile/the stabilized CSI front 4. Measuring the injection parameters such as injection temperature, injection pressure, hydrocarbon concentration, and concentration of $CO_2$ will ensure the accuracy of injection operation so that it results in a stabilized CSI front.

The fluid extracted from the formation is conveyed via a pipe 8 to a separation unit 13 in which gas and/or oil may be separated off and conveyed via a pipe 9

Further separated/recirculated $CO_2$ may be conveyed from the separation unit 13 via a pipe 11 to the injection well 5 to be injected as part of the first and/or second composition. Furthermore, hydrocarbons recirculated from the formation and separated off in the separator 13 may be conveyed to the injection well 5 via a pipe 10 and injected into the formation as part of the first and/or second composition.

These and other examples of the invention illustrated above are provided by way of example only and the actual scope of the invention is to be determined from the following claims.

Terminology

"Enhanced oil recovery" within the context of the present invention, shall be understood as a method in order to enhance recovery of oil from a formation.

"Optimized storage" within the context of the present invention, shall be understood as improving or maximizing storage of $CO_2$ by controlling $CO_2$ movement inside the reservoir through modification of the flow properties of the $CO_2$ composition.

"Supercritical conditions or near super critical conditions" within the context of the present invention, shall be understood as the condition in which a fluid is at a temperature or pressure at, above or near its critical point, where distinct liquid and gas phases do not exist.

A supercritical fluid exists in a phase between liquid and gas. It cannot actually become a liquid or a gas, yet it can demonstrate more gas-like or more liquid-like properties i.e. occupy a different supercritical "phase" by virtue of its viscosity and density. The different phases may be called gas-like or liquid-like phases.

Close to the critical point, small changes in composition, pressure or temperature can result in large changes in phase properties, allowing the design of many phase properties of a supercritical fluid. Thus, it is preferable for the injected compositions to be at or near their critical points so that relatively large change in the properties can be achieved with relatively small changes in the composition, pressure and/or temperature of the injected compositions.

"Geological formations", "formations" "subterranean geological formations" and "reservoir" within the context of the present invention shall be understood as relating to underground formations, storage reservoirs, geological reservoirs or formations consisting of a certain number of rock strata which may be onshore or offshore.

The term "$CO_2$ containing composition" should be understood to mean a composition which comprises $CO_2$ and optionally other components, i.e. it may refer to pure $CO_2$. Similarly, a composition comprising $CO_2$ may refer to pure $CO_2$, $CO_2$ with impurities or $CO_2$ with additional components such as hydrocarbons.

The invention claimed is:

1. A method of Enhanced Oil Recovery (EOR) from paleo or residual oil zones in a subterranean geological formation; the method comprising:
    a first injecting step of injecting a first composition comprising $CO_2$, the first composition being injected at or near its supercritical state, into the subterranean geological formation for a period of time;
    a second injecting step of injecting a second composition comprising $CO_2$ and a hydrocarbon, the second composition being injected at or near its supercritical state, into the subterranean geological formation for a period of time, wherein the first composition and the second composition are different and have viscosity and density at the site of injection that are different;

extracting oil from the subterranean geological formation; and cycling alternately between the first injecting step and the second injecting step.

2. A method as claimed in claim 1, wherein the hydrocarbon in the second composition comprises an intermediate or heavy hydrocarbon.

3. A method as claimed in claim 1, wherein the hydrocarbon in the second composition comprises a light hydrocarbon.

4. A method as claimed in claim 1, wherein the first composition is injected in a gas-like phase and the second composition is injected in a liquid-like phase.

5. A method as claimed in claim 1, wherein the first composition is substantially pure $CO_2$.

6. A method as claimed in claim 1, wherein the method comprises extracting one or more of at least some of the injected $CO_2$ and hydrocarbons.

7. A method as claimed in claim 1, wherein the time periods are each between one month and one year.

8. A method as claimed in claim 1, wherein the hydrocarbon which is in the second composition is selected to make the second composition miscible with residual oil in the subterranean geological formation.

9. A method as claimed in claim 8, wherein the proportion of hydrocarbon is selected to make the second composition miscible with residual oil in the subterranean geological formation.

10. A modified $CO_2$ Enhanced Oil Recovery (EOR) method for oil production from paleo and residual oil zones combined with optimized $CO_2$ storage in which a $CO_2$ composition to be injected at or near its supercritical state into a subterranean geological formation is changed in cycles to create gas-like and liquid like states, wherein to achieve the liquid-like state intermediate and heavy hydrocarbons are added to the $CO_2$ containing composition to modify the density and viscosity of the injected stream.

11. An installation for Enhanced Oil Recovery (EOR) from paleo or residual oil zones in a subterranean geological formation, the installation comprising an injection well leading into the subterranean geological formation for injecting compositions into the subterranean geological formation, a supply of $CO_2$, a supply of a hydrocarbon, a means for controlling the composition injected via the injection well such that the composition can be cyclically alternated between a first composition injected at or near its supercritical state comprising $CO_2$ and a second composition injected at or near its supercritical state comprising $CO_2$ and the hydrocarbon, and a production well for extracting oil from the subterranean geological formation, wherein the first composition and the second composition have viscosity and density at the site of injection that are different.

* * * * *